United States Patent [19]
Khalil

[11] Patent Number: 6,091,961
[45] Date of Patent: Jul. 18, 2000

[54] SYSTEM FOR BROADCASTING MESSAGES FROM A MOBILE RADIO TERMINAL

[75] Inventor: Norbert Khalil, Croissy sur Seine, France

[73] Assignee: Alcatel, Paris, France

[21] Appl. No.: 08/989,031

[22] Filed: Dec. 11, 1997

[30] Foreign Application Priority Data

Dec. 12, 1996 [FR] France .................. 96 15270

[51] Int. Cl.$^7$ .................. H04Q 7/04; H04M 3/42; H04L 12/58
[52] U.S. Cl. .................. 455/466; 455/517
[58] Field of Search .................. 455/466, 517, 455/518, 519, 426

[56] References Cited

U.S. PATENT DOCUMENTS

| | | | |
|---|---|---|---|
| 5,577,102 | 11/1996 | Koivunen | 455/466 |
| 5,579,372 | 11/1996 | Astrom | 455/466 |
| 5,604,921 | 2/1997 | Alanara | 466/45 |
| 5,655,215 | 8/1997 | Diachina et al. | 455/466 |
| 5,692,032 | 11/1997 | Seppanen et al. | 455/466 |
| 5,719,918 | 2/1998 | Serbetciouglu et al. | 455/466 |
| 5,734,645 | 3/1998 | Raith et al. | 455/517 |
| 5,754,946 | 5/1998 | Cameron et al. | 455/517 |
| 5,787,357 | 7/1998 | Salin | 455/466 |
| 5,794,142 | 8/1998 | Vanttila et al. | 455/466 |
| 5,797,096 | 8/1998 | Lupien et al. | 455/466 |
| 5,806,000 | 9/1998 | Vo et al. | 455/466 |
| 5,845,211 | 12/1998 | Roach, Jr. | 455/466 |
| 5,878,033 | 3/1999 | Mouly | 455/517 |
| 5,878,351 | 3/1999 | Alanara et al. | 455/466 |
| 5,878,397 | 3/1999 | Stille et al. | 455/466 |

FOREIGN PATENT DOCUMENTS

WO9409599  4/1994  WIPO .

OTHER PUBLICATIONS

K. Holley, "The GSM Short Message Service", *IEEE Colloqium on GSM and PCN Enhanced Mobile Services*. Jan. 30, 1991, London, UK, pp. 7/1–7/5.

*Primary Examiner*—Edward F. Urban
*Assistant Examiner*—Rafael Perez-Gutierrez
*Attorney, Agent, or Firm*—Sughrue, Mion, Zinn, Macpeak & Seas, PLLC

[57] ABSTRACT

A system for broadcasting messages from a terminal in a mobile radio network offering a service for broadcasting messages from the network, in addition to a point to point type message transmission service, includes a device for indicating that a point to point type message from a terminal is to be broadcast and a device for reacting to any such indication by converting the point to point type message into a message to be broadcast by the network.

7 Claims, 3 Drawing Sheets

SYSTEM FOR BROADCASTING MESSAGES FROM A MOBILE RADIO TERMINAL

BACKGROUND OF THE INVENTION

1. Field of the Invention

The present invention concerns mobile radio systems and in particular mobile radio systems offering, in addition to a telephone service, a data transmission service, in particular a service for transmission of data in the form of short messages and therefore intended more particularly for mobile terminals.

2. Description of the Prior Art

One example of such systems is the GSM system (Global System for Mobile communications).

This system offers an SMS-PP service (Short Message Service-Point to Point) for transmitting messages between two users, one of whom is a user of the GSM network and the other of whom can be a user of the GSM network or a user of another network also offering data transmission services.

The SMS-PP short message transmission service is defined in GSM Recommendations 03.40 and 04.11.

This system additionally offers a service for broadcasting from the network itself short messages bearing information of general interest, for example information on road traffic or on the weather, known as the SMS-CB service (Short Message Service-Cell Broadcast).

This SMS-CB short message broadcast service is defined in GSM Recommendation 03.41.

One aim of the present invention is to provide, in a mobile radio system such as the GSM system in particular, a new type of service consisting in a service for transmitting point to multipoint type messages between users of the network, in other words enabling a user of the network to broadcast information to a set of other users of the network. Examples of applications of a point to multipoint service of this kind include updating in real time by the users themselves of the information broadcast by means of the SMS-CB service, the possibility of communicating with a user group ("group communication" type application), the possibility of communicating incognito with other users, etc.

Another aim of the present invention is to provide a point to multipoint service of this type at lower cost by making optimum use of existing infrastructures.

SUMMARY OF THE INVENTION

The present invention consists in a system for broadcasting messages from a terminal in a mobile radio network offering, in addition to a point to point type message transmission service, a service for broadcasting messages from the network itself, which system includes means for indicating that a point to point type message from a terminal is to be broadcast and means for reacting to any such indication by converting said point to point type message into a message to be broadcast by said network.

In a mobile radio system in which the network additionally cooperates with exterior units constituting message service centers and message broadcast centers to offer said point to point type message transmission and message broadcast services the present invention also consists in a message service center of the above kind and a message broadcast center of the above kind adapted to implement a message broadcast system as defined above.

The present invention further consists in a mobile radio terminal adapted to be used in a message broadcast system as defined above.

Other objects and features of the present invention will become apparent from a reading of the following description of one embodiment of the invention given with reference to the accompanying drawings.

DETAILED DESCRIPTION OF THE PREFERRED EMBODIMENT

Figure 1:
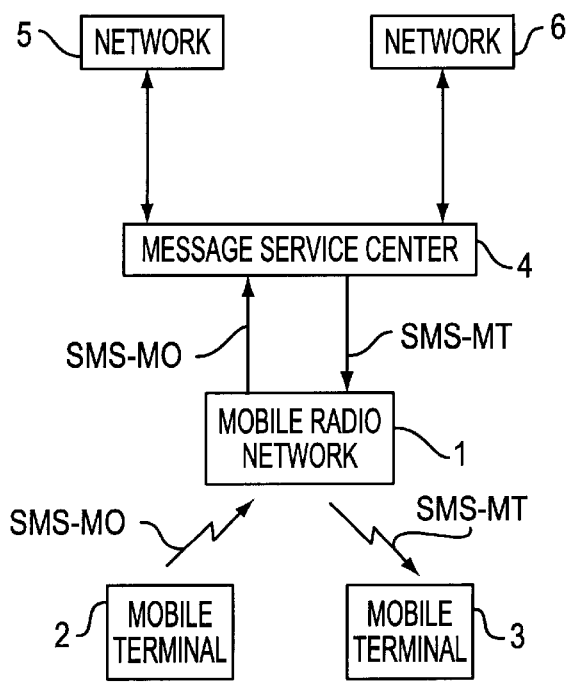
FIG. 1 outlines the principle of short point to point type message transmission using the SMS-PP service offered by the GSM network.

FIG. 1 shows a mobile radio network 1, for example a GSM network, able to communicate with mobile terminals 2 and 3 and with an external unit 4 known as a short message service center (referred to as the SC (Service Center) for short hereinafter), the latter also being able to communicate with one or more other networks offering data transmission services, for example the public switched telephone network (PSTN) 5 and the integrated services digital network (ISDN) 6.

In a manner that is known in itself, the transmission of a short message from a terminal such as terminal 2, for example, entails:

transmitting the short message from the terminal 2 to the SC 4 via the network 1, in this instance using a particular signaling channel of this network known as the SDCCH channel (Standalone Dedicated Control CHannel); the short message transmitted in this way is known as an SMS-MO message (Short Message Service—Mobile Originating), processing of the SMS-MO message by the SC 4 to convert it into a message to be sent to the destination terminal, which can be either that of a user of the network 1, for example the terminal 3, in which case the message obtained in this way is known as an SMS-MT message (Short Message Service—Mobile Terminating), or that of a user of another network, for example the network 5 or the network 6 (this is not specifically shown).

An SMS-MT message is also transmitted from the SC 4 to the destination terminal, for example the terminal 3, via the network 1, using the same signaling channel SDCCH, but in the opposite direction.

Also in a manner that is known in itself, an SMS-MO message includes, in addition to the wanted information, control data including the identity of the addressee of the message (known as the DA: Destination Address) and the identity of the data transmission service used by the destination terminal and/or the network offering this data transmission service (known as the PID: Protocol Identifier).

Figure 2:
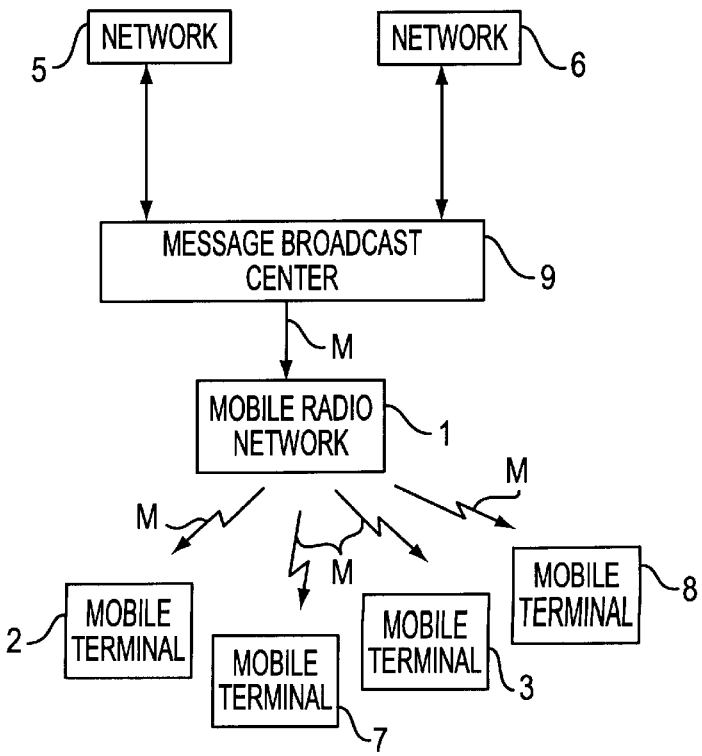
FIG. 2 outlines the principle of short message broadcasting using the SMS-CB service offered by the GSM network.

FIG. 2 shows the same network 1 adapted to communicate with mobile terminals 2, 3 7 or 8 and with an external unit 9 called a short message broadcast center (referred to as the CBC (Cell Broadcast Center) for short hereinafter), itself adapted to receive information to be broadcast via one or more other networks offering data transmission services, for example the network 5 or the network 6.

In a manner that is known in itself, the broadcasting of a short message M from the CBC 9 to the various terminals 2, 3, 7 and 8 in a given geographical area entails the sending of the message by the network 1, in this instance using a particular broadcast channel known as the BCCH (Broadcast Control CHannel) carried by a control frequency transmitted continuously by the network.

Also in a manner that is known in itself, a message of the above kind includes, in addition to the wanted information, control data including the identity of the source of the message (message identifier), enabling users to determine, or rather to have their terminal determine automatically, which messages are for them so that other messages can be ignored, in particular to reduce energy consumption by the terminals. Each of these sources in practice corresponds to a broadcast sub-channel number, the various broadcast sub-channels sharing the broadcast control channel BCCH by virtue of time-division multiplexing. The control data further includes a serial number identifying each of the messages sent successively on a given broadcast sub-channel and a "geographical scope" identifying the geographical area in which a message of the above kind is to be broadcast. This geographical area can be, in decreasing order, the network itself, a set of cells of the network known as a location area, or a single cell of the network.

Figure 3:
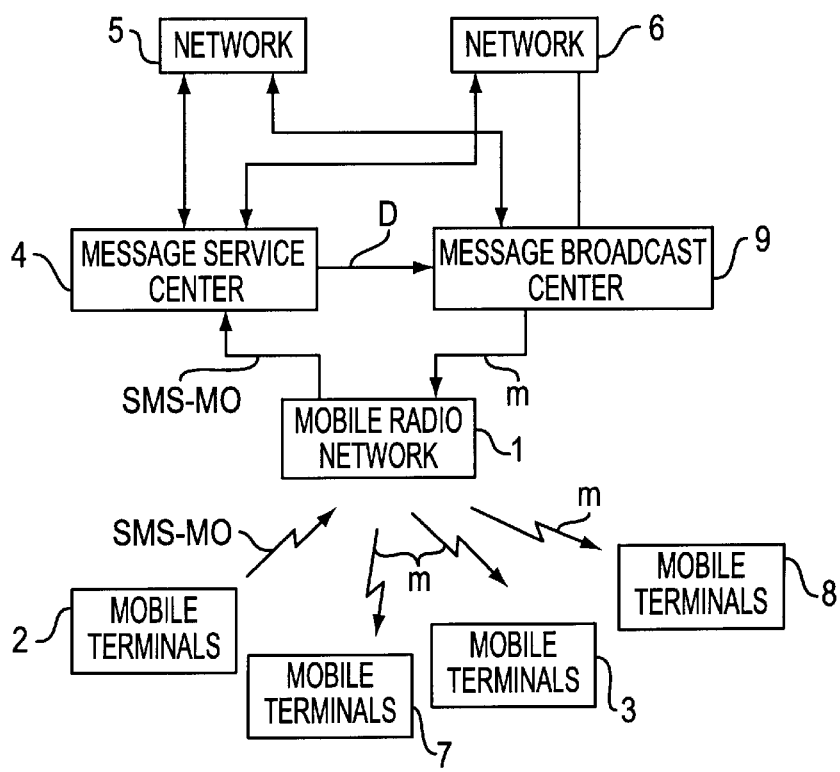
FIG. 3 shows the principle of broadcasting messages, in particular short messages, in accordance with the invention, by way of example in the GSM network.

FIG. 3 illustrates the principle of short message transmission in accordance with the invention. This figure shows the same network 1 able to communicate with the same terminals 2, 3, 7 and 8 and with a short message service center like the SC 4 and with a short message broadcast center like the CBC 9, the latter two units being themselves able to communicate with one or more other networks offering data transmission services, for example the network 5 or the network 6.

The broadcasting by the network 1 of a short message transmitted by one of these terminals, for example by terminal 2, includes the following steps:

transmission of the short message from the terminal 2 to the SC 4 via the network 1 in accordance with the principle outlined above of transmitting an SMS-MO message, production by the SC 4 of corresponding data D required for the CBC 9 to be able to produce a corresponding message "m" to be broadcast by the network 1, transmission of the data D from the SC 4 to the CBC 9, production by the CBC 9 from the data D transmitted in this way of the message "m" to be broadcast by the network 1, broadcasting of this message "m" by the network 1 in accordance with the principle outlined above in relation to the SMS-CB service.

The control data contained in an SMS-MO type message and therefore introduced at the time this message is composed advantageously includes control data specific to the new point to multipoint type service proposed, including control data indicating whether the wanted information contained in the message is to be broadcast by the network 1 or not.

The fact that any such SMS-MO type message is to be broadcast by the network 1 could advantageously be indicated by a particular and as yet unallocated combination of the bits constituting the PID (Protocol Identifier) control data.

Control data can also be used in the broadcast message "m" to enable users receiving such messages to determine (or rather have their terminal determine automatically) if the messages are for them or not, to reduce energy consumption by the terminals, as mentioned above. Also as mentioned above, this control data then consists in a broadcast sub-channel number that can be introduced into the SMS-MO type message at the time the message is composed, for example, either in the wanted information, or in specific control data, or can be provided by the SC 4, for example in accordance with user identification data contained in a database of the SC 4. A broadcast sub-channel number of this kind can be an existing number (which will be the case in particular for applications updating information broadcast by means of the SMS-CB service), or a new number created for other types of applications of the new point to multipoint transmission service.

Control data can also be used in the broadcast message "m" to indicate the type of geographical area in which the message is to be broadcast. This control data can be supplied by the SC 4, for example, after interrogating the network 1 (in particular a database VLR (Visitors Location Register) of the network) to determine the geographical area in which the user who sent the message is located, employing a procedure similar to that currently used to determine the geographical area in which the user to receive a message of this kind is located in the case where a corresponding SMS-MT message is to be sent.

Figure 4:
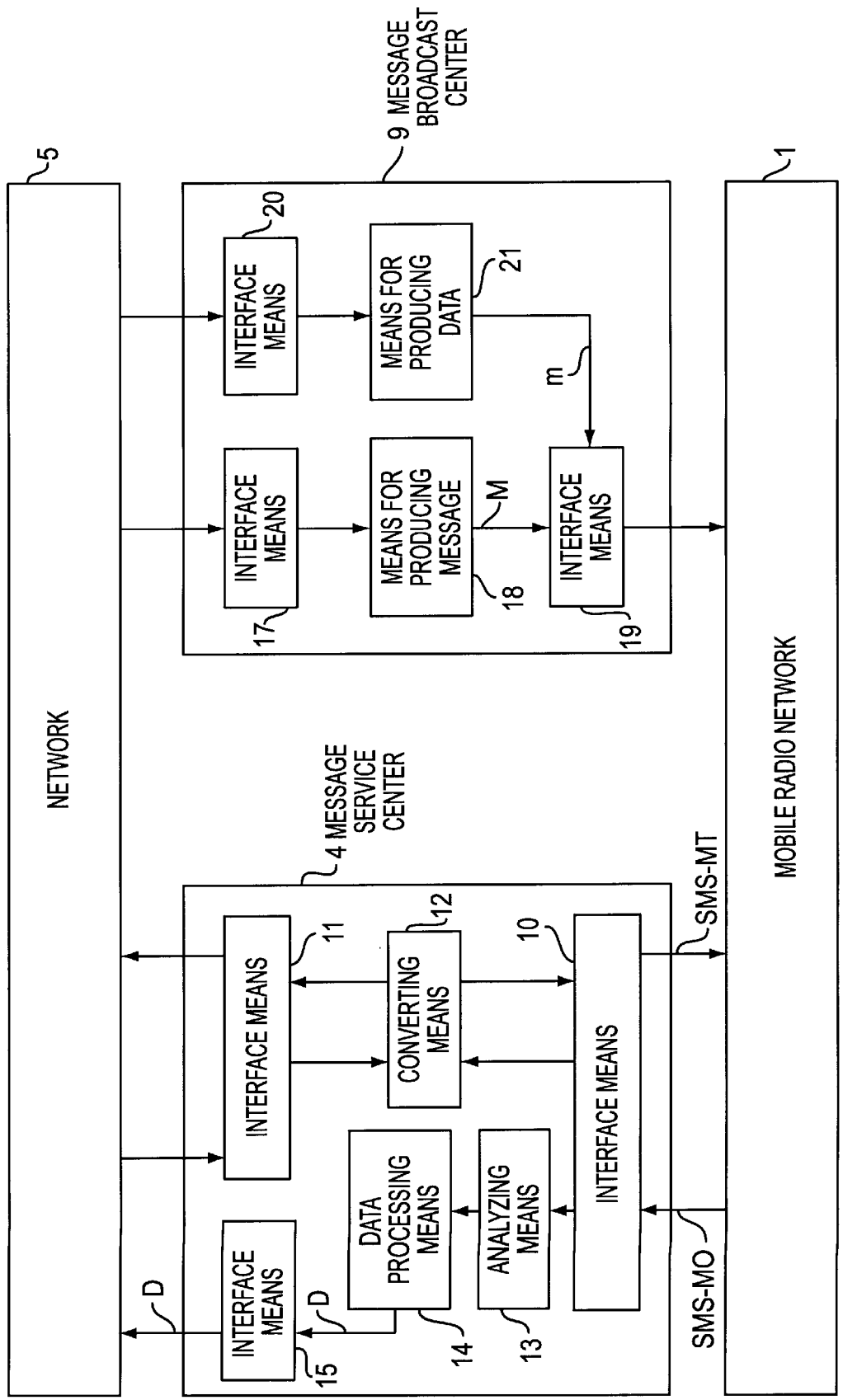
FIG. 4 shows in more detail the means employed to assure the above broadcasting of messages, in particular short messages, in accordance with the invention.

FIG. 4 shows in more detail the means employed to assure the above broadcasting of messages, in particular short messages, in accordance with the invention.

In a manner that is known in itself, the SC 4 includes:

interface means 10 interfacing with the network 1 to receive SMS-MO messages and transmit corresponding SMS-MT messages obtained by converting these SMS-MO messages, interface means 11 interfacing with one or more other networks offering data transmission services, for example the network 5, enabling reception via such networks of messages to be converted into SMS-MT messages or sending via such networks of messages obtained by converting SMS-MO messages, and means 12 for converting messages as above.

In accordance with the invention, the SC 4 further includes:

means 13 for analyzing control data specific to the proposed new point to multipoint type service and contained in the SMS-MO messages received, in particular to determine if the wanted information contained in these messages is to be broadcast by the network 1 or not, using the new point to multipoint type transmission service, means 14 for producing the data D needed for the CBC 9 to be able to produce in turn a message "m" to be broadcast by the network 1 in the situation where the wanted information is to be broadcast by the network 1, and interface means 15 interfacing with transmission means used to transmit such data D to the CBC 9.

In a manner that is known in itself, the CBC 9 includes:

interface means 17 interfacing with one or more other networks, for example the network 5, enabling reception by the CBC of the information to be broadcast by the SMS-CB service, means 18 for producing corresponding messages M to be broadcast by the network 1 from information thus received, and interface means 19 interfacing with the network 1 for transmitting the messages M produced in this way.

In accordance with the invention, the CBC 9 further includes:

interface means 20 interfacing with the transmission means used to transmit the data D to the CBC 9 and, means 21 for producing from the data D thus received the messages "m" to be transmitted to the network 1, in this instance via the interface means 19.

The data D includes, in addition to the wanted information to be broadcast, control data of the messages to be broadcast containing the wanted information and the means 14 can therefore operate simply to obtain said wanted information to be broadcast by extracting the wanted information from the SMS-MO type messages received and to obtain said control data of the messages to be broadcast, for example in accordance with the principles as previously explained.

Implementation of the means 13 does not pose any particular problem to the skilled person and the latter will therefore not be described in more detail.

Implementation of the means 21 does not pose any particular problem to the skilled person either, given the above disclosure, and the latter will therefore not be described in more detail either.

The means for transmitting the data D from the SC 4 to the CBC 9 can be of any kind; in the example shown, the data is transmitted, in accordance with principles that are known in themselves and are therefore not described here, via one of said other networks, for example the switched telephone network 5, in which case the interface means 15 and 20 are conventional switched telephone network interface means.

In the embodiment described, the combination of the means 14, 15, 5, 20 and 21 constitutes means for converting a point to point type message from a terminal into a message to be broadcast by the network 1.

Furthermore, in the embodiment described, the combination of the means 13 and other means included in the mobile terminals for capturing said control data specific to the new point to multipoint type service proposed form means for indicating that a point to point type message from a terminal is to be broadcast by the network 1.

One embodiment of such means for capturing specific control data will now be described, corresponding to the case of terminals including a man-machine interface for enhancing user friendliness by avoiding the need for users to enter the control data of SMS-MO type messages themselves in encoded form, instead offering various options in clear that the user merely has to confirm or not, as required. Said means for capturing said specific control data can then include means for proposing options to the user in clear, for example the option "message to be broadcast", and means enabling the user to confirm these options or not, as required.

Figure 5:
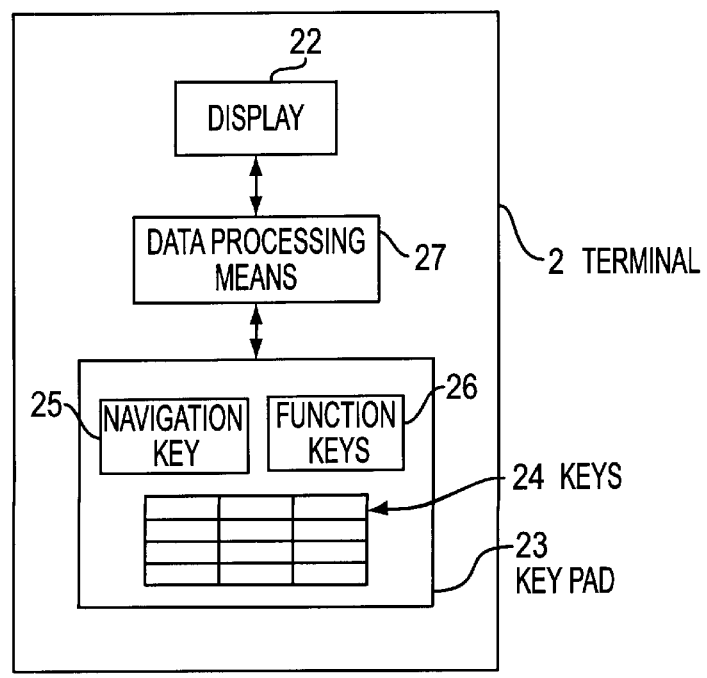
FIG. 5 is a block schematic showing one example of a terminal in accordance with the invention enabling the above broadcasting of messages, in particular short messages, in accordance with the invention.

FIG. 5 therefore shows a terminal, for example the terminal 2, including a display 22 for displaying any such option and a keypad 23 including, in addition to a set 24 of alphanumeric keys, a key such as a navigation key 25, for example, providing access to a menu proposing an option of this kind and allowing movement within this menu, and another function key 26 for confirming an option selected in this way by means of the navigation key, the whole being managed in the conventional manner by data processing means 27 such as a microprocessor, for example.

There is claimed:

1. In a mobile radio network, a message broadcast system, comprising:

a terminal operating in a mobile radio network and originating a message for broadcast having a broadcast indicator and a point-to-point message format;

said network receiving said message for broadcast from said terminal and responding to said broadcast indicator by converting said message for broadcast from said point-to-point format to a broadcast format; and said network broadcasting said message for broadcast in said broadcast format over a broadcast control channel of said network, thereby enabling at least two terminals to determine that said message for broadcast is intended for them.

2. The system of claim 1 wherein:

said message for broadcast in said point-to-point format further includes control information and wanted information, said control information indicating whether said message for broadcast in said broadcast format should include said wanted information;

said mobile radio network cooperates with an external message service center and an external message broadcast center; and said conversion of said message for broadcast from said point-to-point message format to said broadcast format is performed by:

said external message service center detecting said broadcast indicator, said external message service center producing broadcast message data based on said control information, said broadcast message data including said wanted information only when said control information indicates said message for broadcast should include said wanted information, said external message service center forwarding said broadcast message data to said external message broadcast center as enabling data, said external message broadcast center receiving said enabling data, and said external message broadcast center producing, from said enabling data, said message for broadcast in said broadcast format.

3. The system of claim 2, wherein said external message service center provides said broadcast message data to said external message broadcast center using at least one other network.

4. The system of claim 2, wherein said terminal comprises means for capturing said control information.

5. A method for a message service center in a mobile radio network to cooperate in the conversion of a message, originated by a terminal, from a point-to-point format to a broadcast format, comprising:

receiving said message originated by said terminal, said message being a message for broadcast to a plurality of intended recipients, said message for broadcast having a broadcast indicator and said point-to-point message format, said message in said point-to-point format further including control information and wanted information, said control information indicating whether said message in said broadcast format should include said wanted information;

detecting said broadcast indicator;

producing broadcast message data based on said control information, said broadcast message data including said wanted information only when said control information indicates said message for broadcast should include said wanted information; and forwarding said broadcast message data to an external message broadcast center as enabling data.

6. The message service center of claim 5 including means for analyzing said control information.

7. A method for a message broadcast center in a mobile radio network to cooperate in the conversion of a message, originated by a terminal, from a point-to-point format to a broadcast format, said message being a message originated by said terminal having a plurality of intended recipients, a broadcast indicator, control information, and wanted information, said control information indicating whether said message in said broadcast format should include said wanted information, said method comprising:

receiving from an external message service center, enabling data including broadcast message data based on said control information;

producing from said enabling data said message in said broadcast format; and broadcasting said message in said broadcast format, simultaneously, to said plurality of intended recipients over a broadcast control channel.

* * * * *